US009574261B1

(12) United States Patent
Rogers et al.

(10) Patent No.: US 9,574,261 B1
(45) Date of Patent: Feb. 21, 2017

(54) SYSTEM AND METHOD FOR WIRE ARC SPRAY THERMAL SPRAYING

(75) Inventors: Alan R. Rogers, Poulsbo, WA (US); Richard W. Goessman, Silverdale, WA (US); Frank S. Rogers, Silverdale, WA (US); Dean Hooks, Silverdale, WA (US)

(73) Assignee: THERMION INC., Silverdale, WA (US)

( * ) Notice: Subject to any disclaimer, the term of this patent is extended or adjusted under 35 U.S.C. 154(b) by 768 days.

(21) Appl. No.: 13/608,645

(22) Filed: Sep. 10, 2012

Related U.S. Application Data (60) Provisional application No. 61/532,976, filed on Sep. 9, 2011.

(51) Int. Cl.
| | |
|---|---|
| *C23C 4/12* | (2016.01) |
| *C23C 4/18* | (2006.01) |
| *C23C 28/00* | (2006.01) |
| *B05D 5/02* | (2006.01) |
| *B23K 9/04* | (2006.01) |
| *C23C 4/06* | (2016.01) |
| *B05B 7/22* | (2006.01) |

(52) U.S. Cl.
CPC ............... *C23C 4/125* (2013.01); *B05B 7/224* (2013.01); *B05D 5/02* (2013.01); *B23K 9/04* (2013.01); *C23C 4/01* (2016.01); *C23C 4/06* (2013.01); *C23C 4/131* (2016.01); *C23C 4/18* (2013.01); *C23C 28/00* (2013.01); *Y10S 901/43* (2013.01)

(58) Field of Classification Search
CPC ........... C23C 4/125; C23C 4/131; B05B 7/224
See application file for complete search history.

(56) References Cited

U.S. PATENT DOCUMENTS

| | | | |
|---|---|---|---|
| 1,940,814 A | 12/1933 | Saeger, Jr. | |
| 2,423,490 A | 7/1947 | Erhardt | |
| 2,982,480 A | 5/1961 | Gilliland | |
| 3,026,966 A | 3/1962 | Asklöf | |
| 3,251,341 A | 5/1966 | Eburn, Jr. | |
| 3,855,444 A * | 12/1974 | Palena | ........................ 219/76.15 |
| 4,356,971 A | 11/1982 | Ashman | |
| 4,411,940 A * | 10/1983 | Derkacs | .................. B05B 12/12 |
| | | | 244/123.1 |

(Continued)

OTHER PUBLICATIONS

"Engineering and Design—Thermal Spraying: New Construction and Maintenance," Engineer Manual No. EM 1110-2-3401, U.S. Army Corps of Engineers, Washington, D.C., Jan. 29, 1999, 88 pages.

*Primary Examiner* — Katherine A Bareford
(74) *Attorney, Agent, or Firm* — Christensen O'Connor Johnson; Matthew Balint; Ryan Dodge (57) ABSTRACT

A wire arc spray system (100) includes a plurality of arc spray subsystems (130) mounted to a movable carriage (120) on an x-y robot (110). Each arc spray subsystem includes a wire drive (132) that provides wire (133, 134) to a spray head (138) through a pair of lead cables (136). The spray heads are mounted for circular motion, such that the molten spray is applied to an underlying substrate in a swirling pattern. In one embodiment, the spray heads are mounted to a distal end of a rod (164) that extends through a swivel ball joint (166) and engages an eccentric link (162) fixed to a motor (160). The system applies an overlapping pattern of molten spray to provide excellent non-skid and adhesion properties. The system is particularly suited to spray coating with a wire comprising a hollow metallic portion and a core having ceramic particles.

14 Claims, 3 Drawing Sheets

(56) References Cited

U.S. PATENT DOCUMENTS

| | | | |
|---|---|---|---|
| 4,512,513 A | | 4/1985 | Rogers |
| 4,516,521 A | * | 5/1985 | Szelagowski ........... B05B 17/00 |
| | | | 118/305 |
| 4,624,410 A | | 11/1986 | Rogers |
| 5,109,150 A | | 4/1992 | Rogers |
| 5,451,266 A | * | 9/1995 | Kirk et al. ................... 134/25.3 |
| 5,611,248 A | | 3/1997 | Peltier |
| 5,791,560 A | | 8/1998 | Rogers |
| 6,190,740 B1 | | 2/2001 | Rogers |
| 6,623,808 B1 | * | 9/2003 | Jordan et al. ................. 427/455 |
| 6,683,271 B2 | | 1/2004 | Rogers |
| 6,742,719 B2 | | 6/2004 | Tudor |
| 6,843,357 B2 | | 1/2005 | Bybee |
| 2003/0175440 A1 | * | 9/2003 | Molnar et al. ................ 427/404 |
| 2006/0228465 A1 | * | 10/2006 | Zurecki ............................. 427/8 |
| 2008/0034591 A1 | * | 2/2008 | Fung ........................... 30/43.92 |

* cited by examiner

SYSTEM AND METHOD FOR WIRE ARC SPRAY THERMAL SPRAYING

BACKGROUND

Thermal spraying refers to coating or material-addition processes wherein materials are sprayed onto a surface or substrate. The materials that form the coating are typically heated by electrical or chemical means. Thermal spraying has many desirable properties, including the ability to apply thick coatings, for example metal coatings, over large areas and with relatively high speed. Materials used in thermal spraying include metals, alloys, ceramics, plastics, and composites. Thermal spraying modalities include plasma spraying, detonation spraying, wire arc spraying, flame spraying, and high velocity oxy-fuel coating spraying.

Wire arc spray, also called twin-wire arc spray, is a thermal spraying technique using two consumable metal wires that are more-or-less continuously fed in spaced-apart relation into a spray head, sometimes referred to as a spray gun. The two wires are electrified, for example, with a welding machine, and the distal ends of the two wires are angled toward each other. An electric arc generated between the ends of the wires causes the wires to melt in the region of the arc. One or more air jets are directed toward the arc region to entrain the molten feedstock, and transports it to the desired substrate.

In U.S. Pat. Nos. 4,512,513 and 4,624,410, to Rogers (which are hereby incorporated by reference in their entirety), one of the present inventors discloses an arc metal spray apparatus and method for wire arc spray that includes monitoring the distal ends of the wires and temporarily stopping the wire feed process if a failure occurs, such that the system clears the failure by allowing the ends of the wires to melt and become vaporized. Rogers also discloses a wire arc spray system wherein multiple spray heads are mounted to a carriage system with the nozzles directed downward, such that the multiple spray heads can be moved along a path transversely and longitudinally to apply a coating to a substrate.

In U.S. Pat. No. 5,791,560, to Rogers et al. (which is hereby incorporated by reference in its entirety), one or more of the present inventors discloses a wire arc spray head, system, and method wherein a plurality of pressurized gas streams are directed toward the electrical arc to atomize, cool, and uniformly distribute the molten metal into a desired spray pattern.

In U.S. Pat. No. 6,190,740, to Rogers (which is hereby incorporated by reference in its entirety), one of the present inventors discloses a wire arc spray process using a novel feedstock formed as a hollow wire composed of aluminum or zinc, and filled with particles of oxides or carbides to produce a wear-resistant surface on a substrate.

In U.S. Pat. No. 6,683,271, to Rogers (which is hereby incorporated by reference in its entirety), one of the present inventors discloses a voltage-controlled wire arc spray wherein the wire feed motor of the two wires for the wire arc spray process receives power from the same power circuit that creates the arc spray operation such that the wire feed rate is automatically adjusted as voltage changes occur in the spray process.

This invention relates to wire arc spray systems and methods including, for example, wire arc spray systems for surfacing a substrate with non-slip properties, wherein the surfacing material adheres reliably to the substrate and is able to maintain its adherence at very high temperatures.

There is a need in the industry for a metallic or metalized, non-skid coating that provides heat resistance, wear resistance, slip resistance, corrosion protection to the substrate, long-term durability, a rough surface profile, and a high bond strength on all or many types of steels used in naval and other shipbuilding. A particular application for the present method is to provide a metalized surface on ship decks of all types, in particular, aircraft carrier decks for vertical lift aircraft that impart heat onto the deck surface.

Prior art technology does not exist for a sustainable, heat-resistant, non-skid coating system for vertical lift jet aircraft; and thermal spraying has not been used for this application. For example, the present method is suitable for use with a hollow aluminum and/or zinc wire filled at least in part with ceramic particles, such as the wire disclosed in U.S. Pat. No. 6,190,740 discussed above. This type of wire may sometimes be referred to herein as "Thermion® TH604 wire."

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A thermal spray system for applying a coating of material on a substrate includes a two-axis robot or x-y robot having a longitudinal beam, a transverse beam that movably engages the longitudinal beam on one end and is movably supported at the opposite end. The x-y robot also includes a carriage that is drivably movable along the transverse beam. A plurality of metal spray subsystems, each including a spray head, are mounted on the carriage. The spray heads are mounted to the carriage such that the spray head may be separately moved in an arcuate motion. For example, in an embodiment, each spray head is fixed to the distal end of an elongate rod that extends through a swivel joint and includes a motor that drives the proximal end of the rod along an arcuate path. In a current embodiment, the metal spray subsystems are twin wire arc spray subsystems.

In an embodiment, the drive heads are driven along a circular path, for example, by connecting the proximal end of the rod to the motor with an eccentric link, such that the proximal end of the rod is driven along a circular path.

In an embodiment, the swivel ball joint is adjustably mounted to a support such that the intermediate position of the swivel joint along the rod is adjustable, allowing the radius of the circular path to be thereby adjustable.

In an embodiment, the twin wire arc spray system uses first and second wires that include a metal outer portion and a ceramic interior portion.

In an embodiment, a plurality of cooling air jets are disposed on the transverse beam below the carriage.

A method for applying a metalized coating to a substrate includes positioning a multi-head metal spray system on the substrate, wherein the multi-head metal spray system includes a plurality of spray subsystems mounted to a movable carriage portion of an x-y robot. Each of the spray subsystems includes a wire drive and a spray head connected to the wire drive through two lead cables. Electric power, compressed air, and wire are provided to each of the spray subsystems. The spray heads are mounted to means for moving the spray head along an arcuate path, for example, along a circular path, and a molten spray coating is applied to the substrate while also moving the spray subsystems over the substrate with the x-y robot, such that the molten spray coating is applied in a swirling pattern.

In an embodiment, the spray subsystems are twin wire arc spray subsystems. In an embodiment, the wire has a metal outer portion and a ceramic inner portion with ceramic particles.

In an embodiment, the spray heads are moved along a circular path with a drive system that includes an elongate rod that mounts the spray head at a distal end, extends through a swivel ball joint, and is drivably rotated with a motor that engages the rod at a proximal end.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Wire arc spraying provides a relatively rapid and cost-effective means for applying a layer of material to an existing substrate. For example, wire arc spraying can be used to apply a relatively thick layer of metal or metal/ceramic material to a substrate. Because the process can be used to produce a very durable surface on substrates, for example, using the class of materials disclosed in U.S. Pat. No. 6,190,740, wire arc spraying is an attractive technology for protecting objects that operate in challenging environments, for example, the decks of ships and, in particular, the decks of aircraft carriers that must be able to tolerate the extreme temperatures and the chemical and physical environment associated with operating V/STOL aircraft and the physical stressors associated with the equipment required for the operation of aircraft.

Of course, an aircraft flight deck during operations is a hazardous environment for military and other personnel, and it is critically important to also provide non-skid surfaces that will retain non-skid properties under adverse conditions such as wet weather and liquid spills occur, to avoid accidents. The present inventors conceived of the idea of applying a wire arc spray covering onto steel flight decks using, for example, the materials referenced above by spraying the molten material in relatively thin, overlapping layers applied in a swirling pattern. The present inventors reasoned that by using wire arc spraying to apply overlapping layers of material in a swirling pattern, adjacent and overlapping layers would reinforce or build up locally in an essentially unpredictable manner, providing a very textured, but durable non-skid surface.

The novel method for performing wire arc spraying, which is described in more detail below, was found to produce the desired non-skid surface. However, in testing of the finished product, the method was unexpectedly found to also produce a much improved bonding to the substrate. The material applied using the novel swirling pattern for wire arc spraying resulted in a durable layer that was much less prone to flake away from the substrate. A further advantage of the novel method is that the local transient peak heat load to the steel deck plates was lower, because the spray heads were traveling much faster than conventional methods, and less material is deposited in each pass over any particular point on the deck plate.

The novel use of a swirling motion for the application of the thermal sprayed metalized coating lowers the heat input or peak local heat load on the substrate material, providing a coating having a relatively low thickness per pass and distributing the coating over a larger surface area to minimize stress. The swirling motion for the application is configured to partially overlap adjacent passes, allowing a thicker total coating to be applied, and producing a textured surface that has desirable non-skid properties. In particular, the swirling motion for the application of the thermal spray coating has been found to produce improved adhesion between the coating material and steel substrates, an in particular ship deck materials of ordinary steel, for example, HY-80, HY-100, HSLA-100, and the like.

The disclosed thermal spray coating process, therefore, applies a heat-resistant, non-skid deck coating. In particular, it has been found advantageous to use a swirling motion as a means to apply a twin wire arc spray, non-skid coating.

A conventional method for applying a wire arc spray coating is discussed in U.S. Pat. No. 4,512,513, wherein in one embodiment, multiple spray heads are mounted to a two-axis machine, or x-y robot, that is configured to guide the spray heads along a substantially linear longitudinal path, then shift in the transverse direction, and return along a parallel, straight-line longitudinal path. The typical motion is to traverse in the x direction for a distance at a controllable rate, and at the end of that distance, the x direction motion of the spray head is momentarily stopped, the spray head is moved a short distance in the y direction, and then the spray head returns along the x direction, usually overlapping the first pass a predetermined amount to obtain complete coverage.

This reciprocating action continues until a deck section is covered. The two-axis robot may then be repositioned to access another portion of the deck section. Alternatively, the two-axis robot may be configured to gradually move the spray head in the y-direction during the x-direction traversals, and then return, thereby following a zig-zag path. The coating evenness and roughness are mostly determined by the adjustment of the spraying apparatus variables, i.e., air pressure, amperage, and voltage. Low air pressure is the most significant contributor to coating roughness; however, as air pressure is lowered to obtain desirable roughness, the spraying becomes erratic and a coating with less desirable adhesion is applied.

Figure 1:
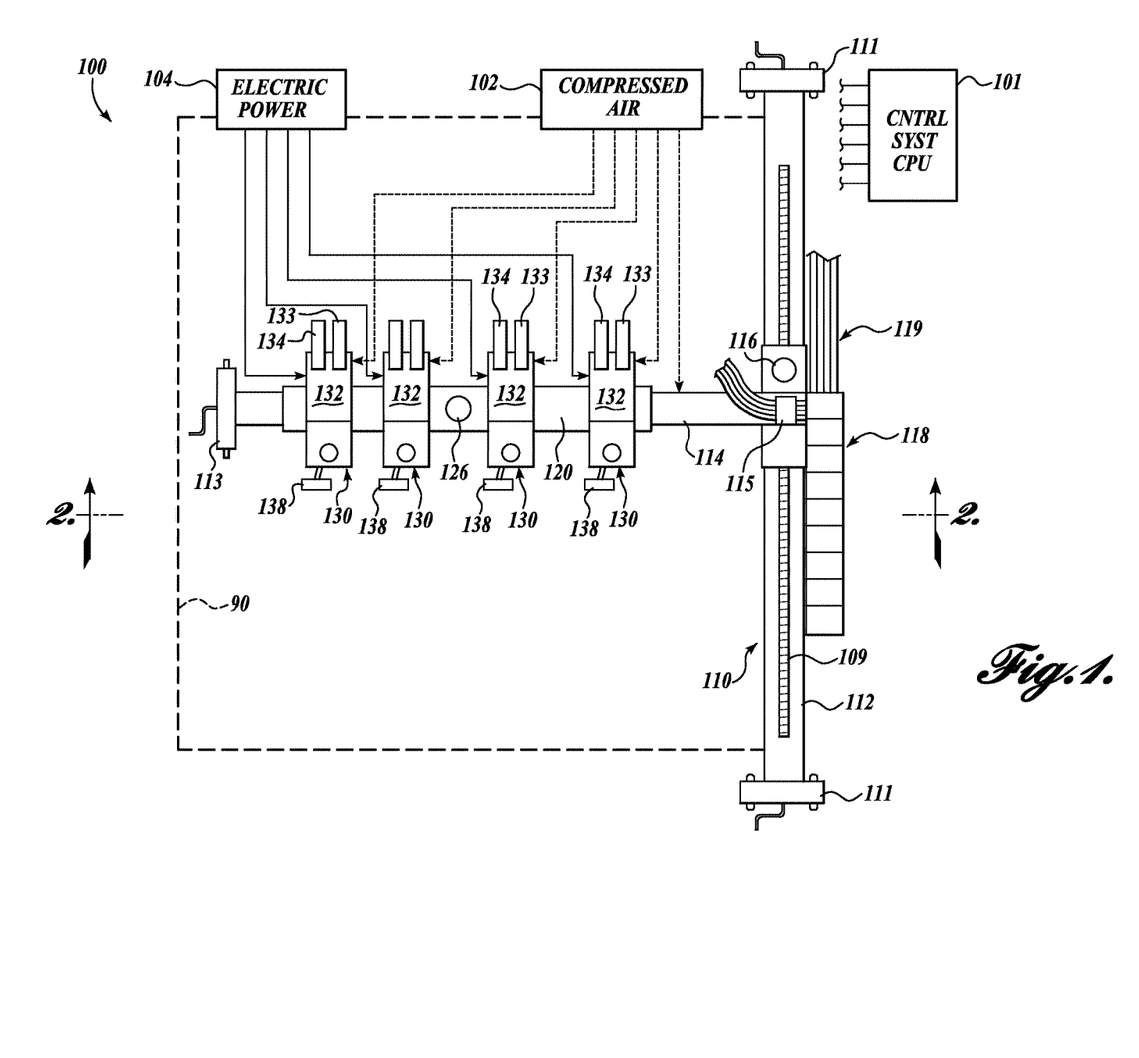
FIG. 1 is a partially schematic plan view of a wire arc spray system in accordance with the present invention.

FIG. 1 shows schematically a multi-head wire arc spray system 100 in accordance with the present invention. In this embodiment, the system 100 includes a two-axis or x-y robot 110 having a longitudinal beam 112 and a transverse beam 114. In this embodiment, the longitudinal beam 112 is supported on either end by jack stands 111 that are height-adjustable. The jack stands 111 may include retractable wheels or the like, to facilitate moving the system 100, for example, to facilitate surfacing large areas, such as ship decks. The transverse beam 114 slidably engages the longitudinal beam 112 at a proximal end, and is supported by a wheeled or otherwise mobile jack stand 113 on the opposite distal end. A first engagement member, for example, a linear gear or rack 109, is fixed to the longitudinal beam 112, and a first controllable drive 116 fixed to the transverse beam 114 engages the rack 109 to move the transverse beam 114 longitudinally. A carriage 120 is slidably attached to the transverse beam 114. A second controllable drive 126 is mounted to the carriage 120, and engages a second engagement member, for example, a rack (not visible) fixed to the transverse beam 114, such that the carriage 120 can be moved or shifted longitudinally along the transverse beam 114.

A plurality of arc spray subsystems 130 (four shown) are fixedly supported on the carriage 120. The arc spray subsystems 130 include a wire drive 132 that is configured to feed a pair of wires to an associated spray head 138. The spray head 138 may be of any conventional design as are known in the art, for example, spray heads such as those disclosed by one of the present inventors in U.S. Pat. Nos. 4,624,410 and 5,791,560. For simplicity and clarity, the lead cables 136 (see, FIG. 2) between the wire drive 132 and the spray head 138 are omitted in FIG. 1. In the current embodiment, the wire drives 132 receive wire from associated spools 133, 134 mounted to the wire drive 132. Alternatively, wire spools or alternatively configured wire sources may be enclosed in the wire drive 132 housing, or mounted separately from the wire drive 132.

As shown schematically in FIG. 1, an external source of compressed air 102 is provided. Pressurized air engages the spray heads 138, e.g., through channels in the lead cables 136 (see, FIG. 2), and directs an air stream toward the wire ends, to propel molten metal toward a substrate 90. In addition, in a current embodiment pressurized air may be provided to a plenum 140 disposed below the transverse beam 114 and directed through nozzles 142 toward the substrate 90 to provide convective cooling, and also to keep particulates suspended in the air to be more readily removed by an air filtration system (not shown).

An external electric power source 104, sometimes referred to as a welding machine or welding power source, is provided to the wire drives 132, and used to electrify the wires to produce the arcing, as is well-known in the art, and described in more detail in the patents incorporated by reference above. A conventional articulated power track 118 with an upstanding wire enclosure 115 is provided, to safely support and relieve tension on the various hoses and wires 119 during operation.

Figure 2:
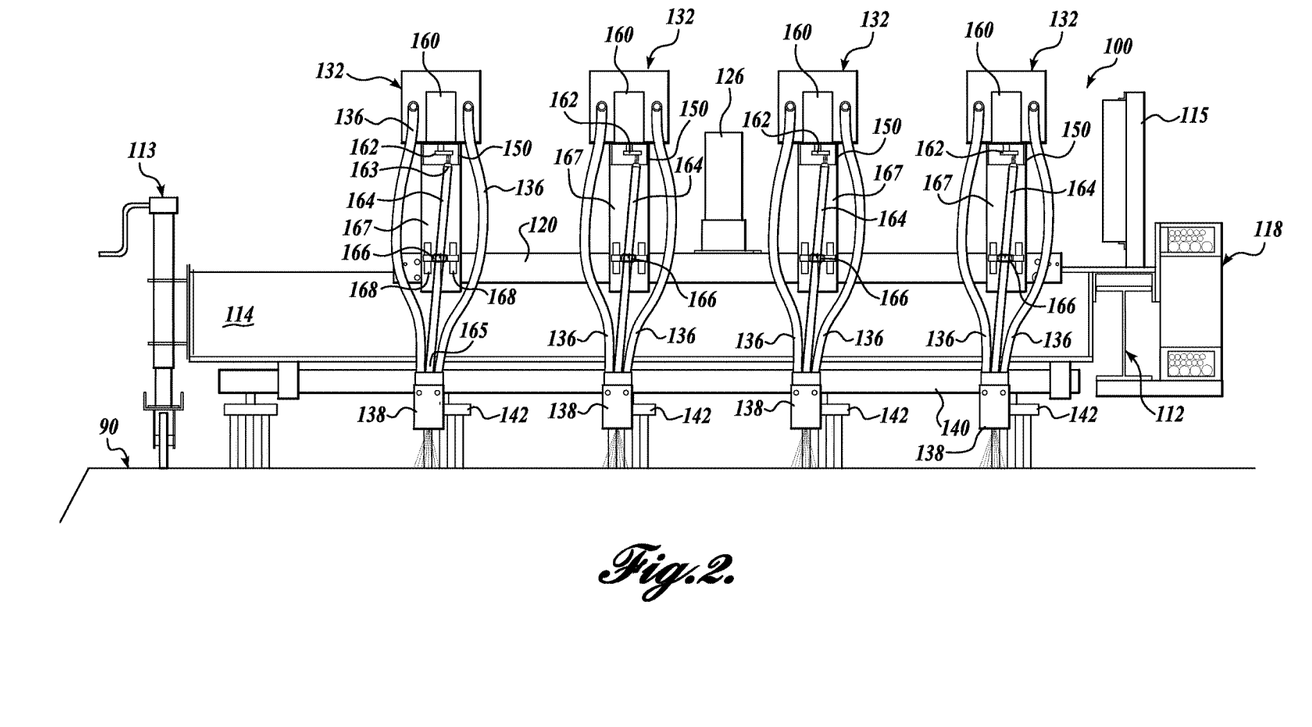
FIG. 2 is a front section view generally through section 2-2 in FIG. 1 of the arc spray system.
Figure 3:
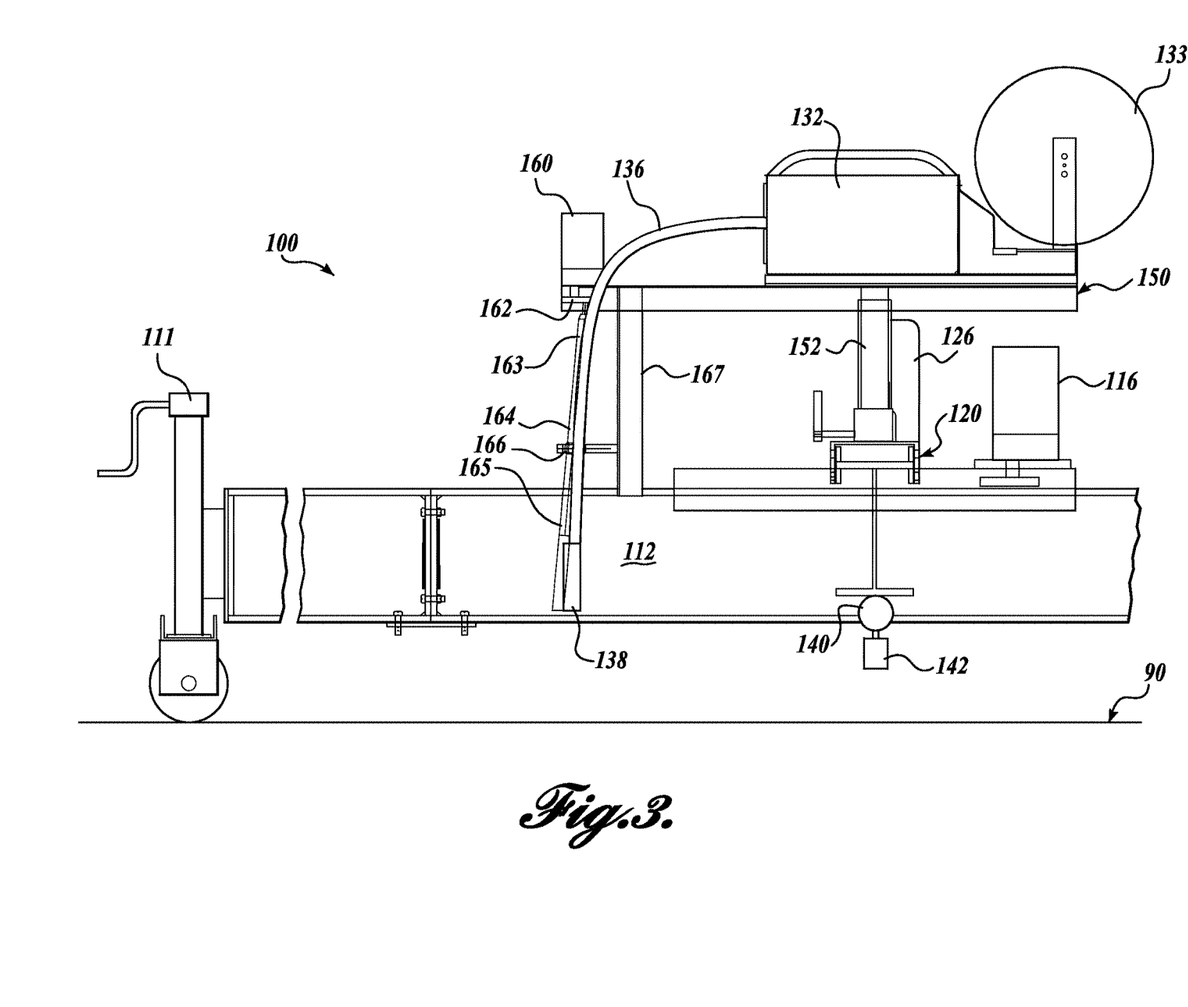
FIG. 3 is a fragmentary side view of the arc spray system shown in FIG. 1.

Refer also to FIG. 2, which illustrates a front section view of the system 100 through section 2-2 in FIG. 1, and to FIG. 3, which illustrates a fragmentary right side view of the system 100 (with the power track 118 and wire enclosure 115 omitted in FIG. 3 for clarity). The wire drives 132 are mounted on height-adjustable platforms 150, which may be simple U-beams mounted on a jack stand 152 that is fixed to the transverse carriage 120.

A motor 160 is attached to each support platform 150, and is configured to rotate an eccentric link 162 disposed below the motor 160. An elongate member or rod 164 has a first end 163 pivotably attached to a distal portion of the eccentric link 162. Each rod 164 extends through a Heim joint or swivel ball joint 166 that is mounted to a support 167. In a current embodiment, the swivel ball joint 166 is mounted in an elongate slot 168 in the support 167, such that the vertical position of the swivel ball joint 166 is adjustable. A second end 165 of the rod 164 supports the associated spray head 138.

Therefore, when the motor 160 is operated the rod 164 moves the spray head 138 along a generally circular path. The radius of the circular path is determined by the length of the rod 164, the length of the eccentric link 162, and the position of the swivel ball joint 166. In particular, the radius of the circular path is readily adjustable by the user by simply adjusting the vertical position of the swivel ball joint 166. It will be appreciated that because the support platform 150 supporting the motor 160 is separately height-adjustable, the radius of the circular path and the distance between the substrate 90 and the spray head 138 may be adjusted independently.

A control system 101 (see, FIG. 1), which may include a central processing unit, computer memory, control and actuating hardware, and monitoring systems, is operatively connected to the various subsystems to control the operation of the system 100.

To use the multi-gun wire arc spray system 100, typically the assembly is transported to the location of the substrate 90, for example, to the ship deck to be provided with a metalized, non-skid coating. The system is connected to one or more electric power sources 104 and compressed air sources 102. In a turnkey system, these sources 102, 104 may be included and incorporated into the system 100. Alternatively, the air and power may be externally available. The x-y robot 110 is then moved to the first section of substrate 90 to be coated. It will be appreciated that the x-y robot 110 is mounted on mobile jack stands, and is readily and easily transportable. System settings for the particular application may be set, for example, the height of the wire drives 132 (which may set the height of the corresponding spray heads 138), the elevation of the swivel ball joints 166 (which may set the radii of the circular motion of the spray heads 138), and other system parameters, such as motor speeds, air pressures, power settings, etc.

In one mode of operation, the position of the carriage 120 is set to one of its end stops, and the transverse beam 114 is moved along a linear path parallel to the longitudinal beam 112 from a first end stop of the longitudinal beam 112 to the opposite second end stop at a constant speed. The spray heads 138 apply a coating to the substrate 90 with the spray heads 138 moving along a swirling path defined by the linear motion of the transverse beam 114 and the circular motion generated by the motors 160. Upon reaching the second end stop, the carriage 120 shifts laterally and the transverse beam 114 is moved in the opposite direction at a constant speed. In an exemplary embodiment, the carriage shift is in the range of 0.5 to 2.5 inches, such that there is substantial overlap in the material sprayed onto the substrate 90 for adjacent passes. For example, in an exemplary embodiment, the spray in adjacent passes overlap by more than fifty percent, such that at least most of the coated substrate receives at least three layers of coating.

The transverse beam 114 is then moved back and forth multiple times, with the carriage 120 shifting at the end of each longitudinal pass, until the carriage has cumulatively shifted by an amount approximately equal to the spacing of the arc spray subsystems 130. For example, in a current system the arc spray subsystems 130 are spaced every two feet on the carriage 120. The system may be configured to operate until the carriage 120 has shifted two feet in total. In the current embodiment the cooling air system is simultaneously blowing compressed air through the nozzles 142 as the metalizing coating is applied.

For larger projects, when one section has been provided with a coating, the system 100 is readily movable to a next section to be coated.

Other options for applying the swirling pattern of material to a substrate will be obvious based on the present teachings. For example, it is contemplated that the carriage 120 may be gradually shifted in the transverse direction as it transits longitudinally, such that the swirling path is slightly angled with respect to the longitudinal beam 112.

Using the method disclosed in the present application, with the spray head 138 driven along an arcuate or circular path while also being moved along a linear path by the x-y robot 110, a non-uniform but consistent overlapping coating material is applied to produce a mounding of material due to the overlapping application. The mounding of the material achieves a more desirable coating with improved non-skid properties. Although the currently preferred embodiment moves the spray heads 138 in a circular motion, which is believed to be an easily implemented embodiment, it is contemplated that other patterns of motion may be alternatively used. For example, the spray heads may be moved along a reciprocating linear path (with respect to the moving subsystems 130), such that the combination of the x-y robot 110 motion and the reciprocating linear path produce an arcuate motion (with respect to the substrate).

In particular, the peak heat load to which the substrate is subjected for a given linear speed is significantly reduced due to the swirling motion of the spray heads 138. Unexpectedly, the swirling application was found to produce superior adhesion between the applied coating and the substrate. In particular, in applications where the substrate comprised steel deck plates, the swirling application was found to be less subject to flaking or otherwise separating from the underlying substrate. It is believed that the improved adhesion is due to the reduction in the peak heat load. It will also be appreciated that the reduced peak heat load for a given linear speed also allows the system 100 to be used with substrates that cannot withstand higher heat loads, or that might become damaged or warped due to localized peak heat loads. Alternatively, the system 100 may allow for more rapid application of the desired coating due to the reduced peak heat loading.

The swirling motion can be used to provide the following improvements: (i) applying a thicker (heavier) coating; (ii) obtaining higher bond strength coatings; (iii) obtaining a rougher, more desirable profile for shipboard applications; (iv) applying non-skid coating manually; (v) applying a non-skid coating with a machine or robot; (vi) improving the thermal spraying operations; and (vii) reducing heat input into the substrate.

The present system 100 may be used to apply a top coat of a gray or black ceramic over the non-slip coating, such as Thermion® TH604™ wire (metal/ceramic) coating, to obtain the desired color and/or heat-resistant properties.

It will also be appreciated, and it is contemplated by the present invention, that the parameters of the system 100 may be readily adjusted to meet the requirements of many different projects. For example, the particular wire material to be applied may be selected, and the wire drive 132 settings adjusted to accommodate the selected wire material. Similarly, the air pressure to the spray heads 138 and the air pressure to the plenum 140 for the cooling air may be adjusted for the particular application. The speed and distance of the x-y robot 110 are readily adjustable, including the stops for setting the longitudinal travel of the longitudinal beam 112. It is also contemplated that more or fewer arc spray subsystems 130 may be provided for a particular system, and that the system 100 may be operated with fewer than all of the subsystems 130.

The present method has been used to experimentally apply a ceramic coating to a test platform at PAX River Naval Air Station in Maryland. The test platform was about 200 ft$^2$ of surface area made up of several different steel materials, HY-80, HY-100, and HSLA-100. A prior coating of this platform using a different method failed due to delamination on the HY-100 and HSLA-100 materials as a result of the high heat being delivered into all the materials, presumably weakening the bond on all the material types. The prior coating was applied using a machine with an x-y pattern with no manipulation of the head.

The present thermal spray for a non-skid coating for high-heat applications provides the means for a long-term coating system for vertical landing and semi-vertical landing aircraft (usually jet or turbine) that impart heat onto the landing surface. Present day non-skid systems use organic-type paint that will not withstand the heat. Thermal spray provides the means of applying onto the deck surface a metal or metal/ceramic mix material that will withstand the heat subjected to the deck.

In a currently preferred method after applying the thermal spray coating as discussed above, the metalized coating is sealed and painted using a high-temperature paint, to further enhance the nonskid performance, to fill and/or seal pores in the coating, to improve the cleanability of the surface, and/or to provide a desired appearance, for example to produce a conventional flight deck appearance. Information on particular materials for sealing and painting thermal spray coatings may be found in CEGS-09965 and EM 1110-2-3400. Thermal spray coatings are also self-sealing. Over time, natural corrosion products fill the pores in the coating. Oxidation consumes a relatively minor amount of the metal coating. In particular, the paint/sealer may prevent the accumulation of corrosive salts, rain-borne corrosives, and bird droppings.

A benefit of using a deck machine to apply a heat-resistant, non-skid coating is that it provides the means to obtain a desirable coating roughness, to improve productivity, to minimize applicator exposure to hazards, and to improve reliability of application and coating performance.

A use of the twin wire arc spray technology with the TH604 material is a new application for depositing a non-skid coating using a deck machine.

The coating is applied using a circular motion of the spray head. This circular motion of application has benefits that were unforeseen when the original idea was developed. At that time, the goal was only to obtain a higher bond and therefore make the process usable on the high yield steel decks. Other benefits include the ability to create a more desirable rough coating that extends usability and is more appealing to ship's personnel, lowers heat input into the deck surface, allows for a thicker coating to be applied, and improves equipment performance due to the allowance of higher air pressure. Additional benefits include the ability to be applied to naval ship deck materials of ordinary steel, HY-80, HY-100, HSLA-100, and others.

The present process of a currently preferred embodiment uses a swirling motion of the spray head while moving the head to thermal spray a material to form a non-skid coating on the substrate. The present invention has been tested using the Thermion® Arc Voltage Drive™ Twin Wire Arc Spray System, with Thermion® TH604 cored wire as the coating material. The Twin Wire Arc Spray process uses two wires that feed through a set of liners to the spray head where they intersect and form a mass of melted material. This material is propelled to the substrate with compressed air intersecting at the rear of the intersecting wires, the wires continue to feed, and the air continues to blow the molten metal to the substrate. This invention is the art of rotating the spray head in a circular motion while also moving the spraying apparatus in a longitudinal motion. The first application of this invention uses a machine to perform these movements, as means are provided to move the spray head in a circular motion, means are provided to move the spray head in a longitudinal direction, and at the end of the longitudinal direction, means are provided to index the spray head in a horizontal direction, and thereby, with continuous cycling, a coating of a more desirable surface texture is applied.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for applying a molten metalized non-skid coating to a substrate comprising:
   positioning a multi-head metal spray system on the substrate such that at least a portion of the multi-head metal spray system is supported by the substrate, wherein the multi-head metal spray system comprises first and second spray subsystems mounted on a movable carriage portion of an x-y robot, and further wherein the first spray subsystem includes a first wire drive and a first spray head operably connected to the first wire drive, and the second spray subsystem includes a second wire drive and a second spray head operably connected to the second wire drive;
   providing electrical power, compressed air, and two sources of wire to each of the first and second spray subsystems;
   mounting the first spray head to a first motor-driven rod configured to move the first spray head along a first cyclical arcuate path about a first axis, and mounting the second spray head to a second motor-driven rod configured to move the second spray head along a second cyclical arcuate path about a second axis, wherein the first and second axes are fixed relative to the carriage portion; and
   applying a molten spray coating to the substrate with the first and second spray subsystems while moving the carriage portion along a carriage path with the x-y robot while also moving each of the first and second spray heads along its respective cyclical arcuate path such that the molten spray coating is applied in a swirling pattern, wherein adjacent and overlapping layers of the molten spray coating form locally built up areas that provide a textured non-skid surface on the substrate.

2. The method of claim 1, wherein the spray subsystems comprise twin wire arc spray subsystems.

3. The method of claim 1, wherein the first motor-driven rod comprises an elongate member having (i) a proximal end that is connected to a motor through an eccentric link, (ii) an intermediate portion that engages a mounted swivel ball joint, and (iii) a distal end that supports the first spray head.

4. The method of claim 3, wherein a vertical height of the swivel ball joint is adjustable.

5. The method of claim 1, wherein the x-y robot moves the spray subsystems along a plurality of longitudinal back-and-forth paths, wherein each path is shifted transversely from a preceding path.

6. The method of claim 1, wherein the spray subsystems are mounted to the carriage on a platform that is height-adjustable.

7. The method of claim 1, wherein a plurality of nozzles are mounted below the carriage, and further comprising directing a cooling air jet onto the substrate through the plurality of nozzles.

8. The method of claim 1, wherein the wire comprises a hollow metal portion and a core portion comprising ceramic particles.

9. The method of claim 1, wherein the first cyclical arcuate path comprises a circular path having a radius that is adjustable.

10. The method of claim 1, further comprising applying a paint over the applied spray coating.

11. A method for applying a molten metalized non-skid coating to a substrate comprising:
    positioning a metal spray system on the substrate such that at least a portion of a multi-head metal spray system with multiple spray subsystems is supported by the substrate, wherein the metal spray system comprises a first spray subsystem mounted on a movable carriage portion of an x-y robot, the first spray subsystem including a first wire drive and a first spray head operably connected to the first wire drive through two lead cables, wherein the first spray head is movable about a first axis that is fixed relative to the movable carriage;
    providing electrical power, compressed air, and two sources of wire to the first spray subsystem;
    mounting the first spray head to means for moving the first spray head along a first circular path about the first axis; and
    applying a molten spray coating to the substrate in a swirling pattern with the first spray head while moving the carriage portion along a path with the x-y robot, while also moving the first spray head along the first circular path about the first axis, wherein adjacent and overlapping layers of the molten spray coating form locally built up areas that provide a textured non-skid surface on the substrate.

12. The method of claim 11, wherein the metal spray system comprises a second spray subsystem mounted on the movable carriage portion of the x-y robot, the second spray subsystem including a second wire drive and a second spray head operably connected to the second wire drive, wherein the second spray head is movable about a second axis that is fixed relative to the movable carriage, and is mounted to means for moving the second spray head along a second circular path about the second axis, wherein the method further comprises the step of moving the second spray head along the second circular path about the second axis.

13. A method for applying a molten metalized non-skid coating to a substrate comprising:
    positioning a metal spray system on the substrate such that at least a portion of a multi-head metal spray system with multiple spray subsystems is supported by the substrate, wherein the metal spray system comprises a first spray subsystem mounted on a movable carriage portion of an x-y robot, the first spray subsystem including a first wire drive and a first spray head operably connected to the first wire drive through two lead cables, wherein the first spray head is movable about a first axis that is fixed relative to the movable carriage;
    providing electrical power, compressed air, and two sources of wire to the first spray subsystem;
    mounting the first spray head to means for moving the first spray head along a first arcuate path about the first axis; and
    applying a molten spray coating to the substrate in a swirling pattern with the first spray head while moving the carriage portion along a path with the x-y robot, while also moving the first spray head along the first arcuate path about the first axis, wherein adjacent and overlapping layers of the molten spray coating form locally built up areas that provide a textured non-skid surface on the substrate.

14. The method of claim 13, wherein the metal spray system comprises a second spray subsystem mounted on the movable carriage portion of the x-y robot, the second spray subsystem including a second wire drive and a second spray head operably connected to the second wire drive, wherein the second spray head is movable about a second axis that is fixed relative to the movable carriage, and is mounted to means for moving the second spray head along a second arcuate path about the second axis, wherein the method further comprises the step of moving the second spray head along the second arcuate path about the second axis.

\* \* \* \* \*